United States Patent
Chen (10) Patent No.: US 7,037,629 B1
(45) Date of Patent: May 2, 2006

(54) METHOD FOR FABRICATING A COLOR FILTER

(75) Inventor: Jui-Hsi Chen, Taipei (TW)

(73) Assignee: Arima Computer Corporation, Taipei (TW)

(*) Notice: Subject to any disclaimer, the term of this patent is extended or adjusted under 35 U.S.C. 154(b) by 0 days.

(21) Appl. No.: 10/981,003

(22) Filed: Nov. 4, 2004

(51) Int. Cl.
*G02B 5/20* (2006.01)
*G02F 1/1335* (2006.01)

(52) U.S. Cl. ............................................. 430/7
(58) Field of Classification Search ............... None
See application file for complete search history.

(56) References Cited

U.S. PATENT DOCUMENTS 5,464,714 A * 11/1995 Watanabe et al. ............. 430/7

2004/0197681 A1 * 10/2004 Yaung ............................ 430/7

* cited by examiner

*Primary Examiner*—John A. McPherson
(74) *Attorney, Agent, or Firm*—Volpe and Koenig, P.C.

(57) ABSTRACT

A method for fabricating a color filter (CF) is provided. The method includes steps of providing a substrate and forming a dielectric layer thereon, performing a first lithography process with a first photoresist on the dielectric layer to form a plurality of first pixels, performing a second lithography process with a second photoresist on the dielectric layer to form a plurality of second pixels, wherein the second pixels overlap the first pixels, which the second pixels are next to, performing a third lithography process with a third photoresist on the dielectric layer such that the dielectric layer is covered with the third photoresist, and calendering a cylinder on the third photoresist to form a plurality of third pixels and to form a flat surface by the first, the second and the third pixels.

14 Claims, 9 Drawing Sheets

METHOD FOR FABRICATING A COLOR FILTER

FIELD OF THE INVENTION

The present invention relates to a method for fabricating a color filter (CF), and more specifically, to a method for improving the efficiency of the polishing process of a color filter.

BACKGROUND OF THE INVENTION

With the proceeding of modern manufacturing technologies, the liquid crystal display (LCD) has been in widespread use. The working principles of the LCD are using an electric field to control the arrangement of liquid crystal molecules and displaying brilliant or dark images by the beams of the backlight which have passed the liquid crystal molecules or not. The performance of a liquid crystal display extremely depends on the properties of the optical components implemented therein, especially the quality of the color filter (CF) configured therein.

Figure 1:
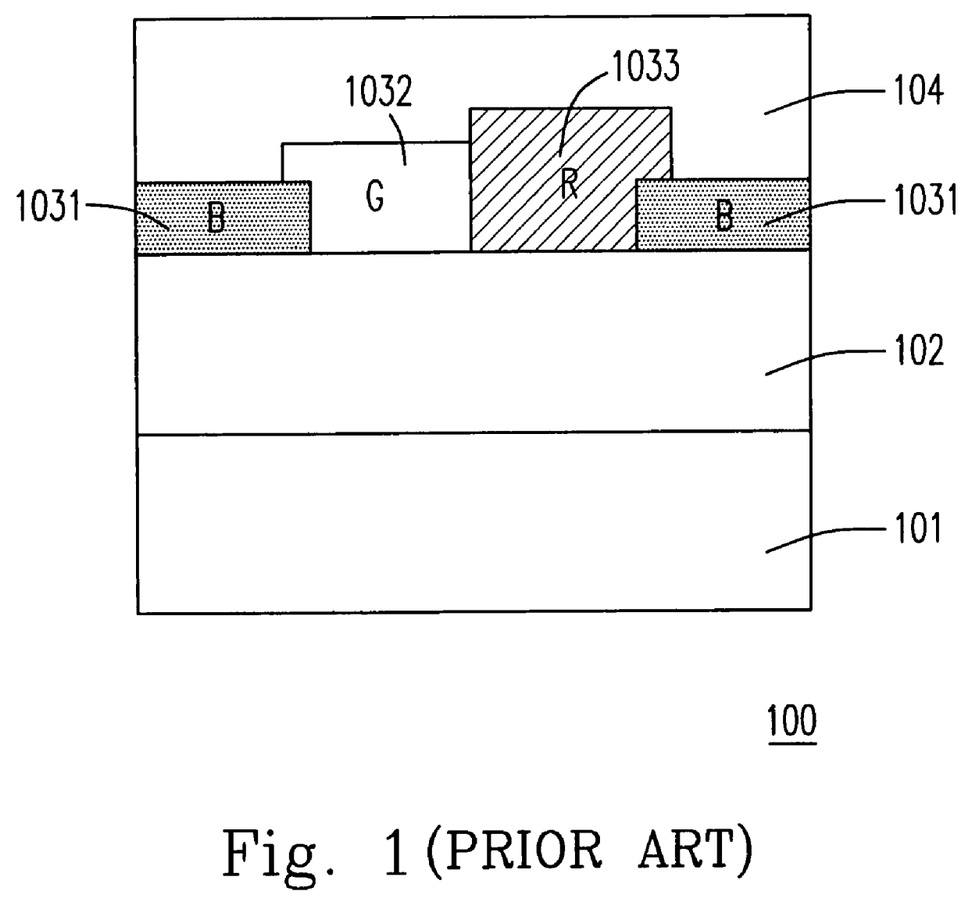
FIG. 1 shows a method for fabricating a color filter according to the prior art.

Please refer to FIG. 1, which shows a fabrication process for a color filter according to the prior art. As shown in FIG. 1, a transparent and polished oxidated layer 102 is formed on a silicon substrate 101. Then the oxidated layer 102 is covered with a blue photoresist. After a lithography process is provided, the blue pixels 1031 are formed. Next, the green pixels 1032 are formed by covering a green photoresist on the oxidated layer 102 and proceeding two lithography processes with a 25% pattern proportion. After covering a red photoresist on them and proceeding a lithography process, the red pixels 1033 are formed. Finally, another transparent and polished oxidated layer 104 is formed to cover the pixels and the silicon substrate 101, so that a whole color filter 100 is fabricated.

However, such a process has two disadvantages as follows:

First, during the manufacturing process of the pixels, the pixels of different colors would easily overlap or cover with each other because of the misalignment. The gaps between different pixels lead to the interference of light. To prevent this defect, the process of the green pixels 1032 must have two lithography processes, which increases the cost substantially.

Second, the different coating thickness of the blue photoresist, green photoresist and red photoresist result in a surface with a high roughness. The roughness cause the pixels of different colors to have different photo-transmission rates, which may influence the performance of the color filter 100.

To solve the problems, a method for fabricating a color filter is disclosed in the Taiwan Patent No. 00533589. The method includes steps of proceeding two lithography processes to respectively form the blue pixels 1031 and the red pixels 1033, and proceeding an etch-back process thereon to reveal the surfaces of the blue pixels 1031 and the red pixels 1033 covered by a green photoresist. Through this method, the accomplished blue pixels, red pixels 1033 and green pixels 1032 may have an identical thickness.

However, this improved method still fails to control the thickness of different pixels well. Moreover, although one lithography process of the green pixels 1032 manufacturing process is omitted, the cost down is still limited since an additional etching process is needed.

It is therefore attempted by the applicant to deal with the above situation encountered in the prior art.

SUMMARY OF THE INVENTION

In accordance with one aspect of the present invention, a method for fabricating a color filter is purposed. The method is characterized by providing a calendaring process to remove and polish the overlap of different photoresist layers.

According to the aspect of the present invention, the method for fabricating a color filter (CF) includes steps of providing a substrate and forming a dielectric layer thereon; performing a first lithography process with a first photoresist on the dielectric layer to form a plurality of first pixels performing a second lithography process with a second photoresist on the dielectric layer to form a plurality of second pixels, wherein the second pixels overlap the first pixels, which the second pixels are next to, performing a third lithography process with a third photoresist on the dielectric layer such that the dielectric layer is covered with the third photoresist, and calendering the third photoresist through a cylinder to form a plurality of third pixels and to form a flat surface by the first, second and third pixels.

According to another aspect of the present invention, the method for fabricating a color filter includes steps of providing a substrate and forming a dielectric layer thereon, performing a first lithography process with a first photoresist on the dielectric layer to form a plurality of first pixels, performing a second lithography process with a second photoresist on the dielectric layer to form a plurality of second pixels, wherein the second pixels overlap the first pixels, which the second pixels are next to, performing a third lithography process with a third photoresist on the dielectric layer such that the dielectric layer is covered with the third photoresist, and calendering the third photoresist to form a plurality of third pixels and to form a flat surface by the first, second and third pixels.

Preferably, the dielectric layer is made of silicon oxide.

Preferably, the first photoresist is a blue photoresist, the first pixels are blue pixels, the second photoresist is a red photoresist, the second pixels are red pixels, the third photoresist is a green photoresist, and the third pixels are green pixels.

Preferably, the blue, the red, and the green photoresists are negative photoresists.

Preferably, the first photoresist is a red photoresist, the first pixels are red pixels, the second photoresist is a blue photoresist, the second pixels are blue pixels, the third photoresist is a green photoresist, and the third pixels are green pixels.

Preferably, the blue, the red, and the green photoresists are negative photoresists.

Preferably, the cylinder is a roller.

Preferably, the method further includes a step of: stretching the third photoresist by a rolling machine.

The above objects and advantages of the present invention will become more readily apparent to those ordinarily skilled in the art after reviewing the following detailed descriptions and accompanying drawings, in which:

BRIEF DESCRIPTION OF THE DRAWINGS

FIGS. 2 (a) to (e) show a method for fabricating a color filter according to the present invention; and FIGS. 3 (a) to (c) are respective top views of the different pixels shown in FIGS. 2 (a) to (e).

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 2A:
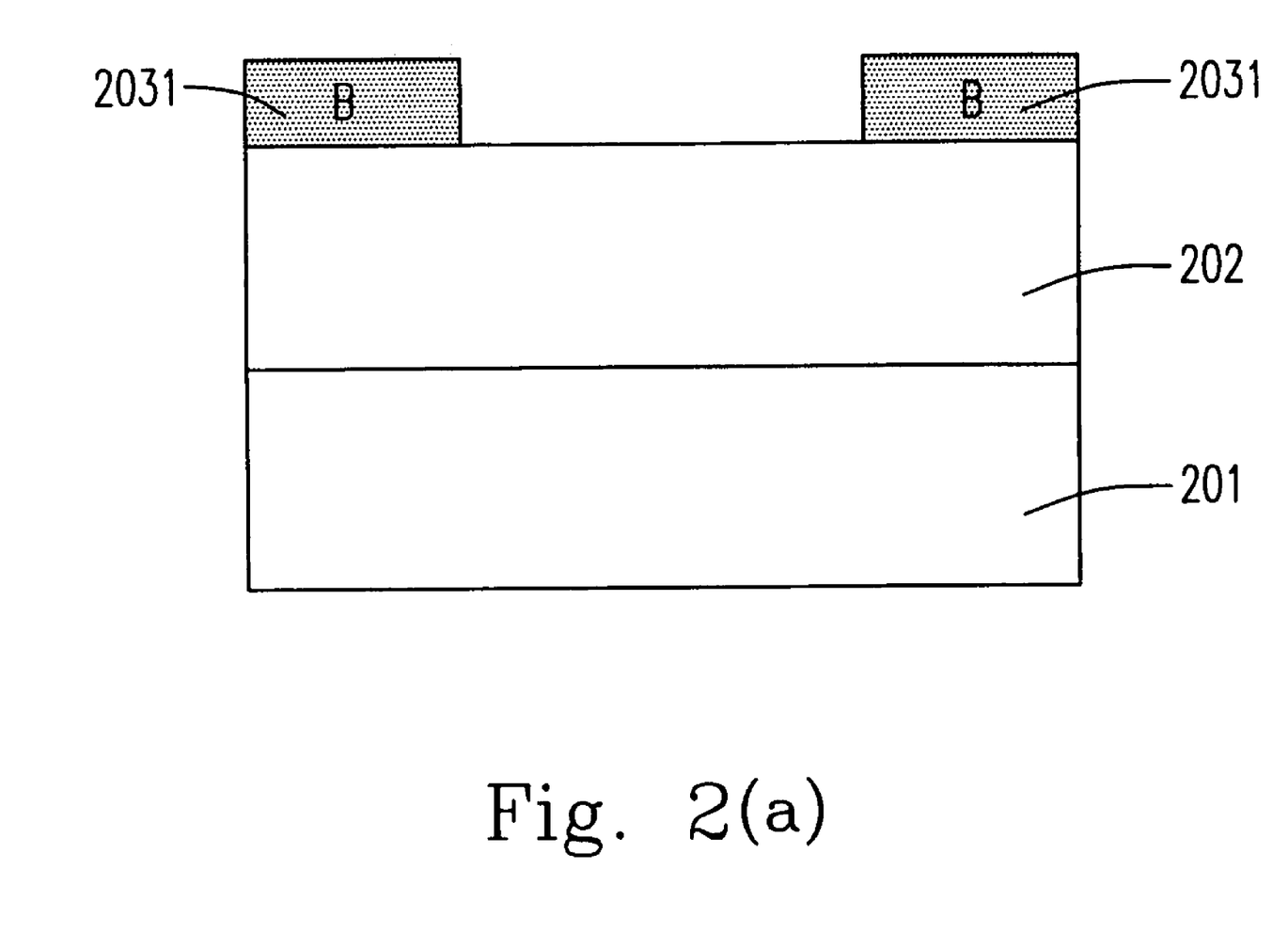
Figure 2B:
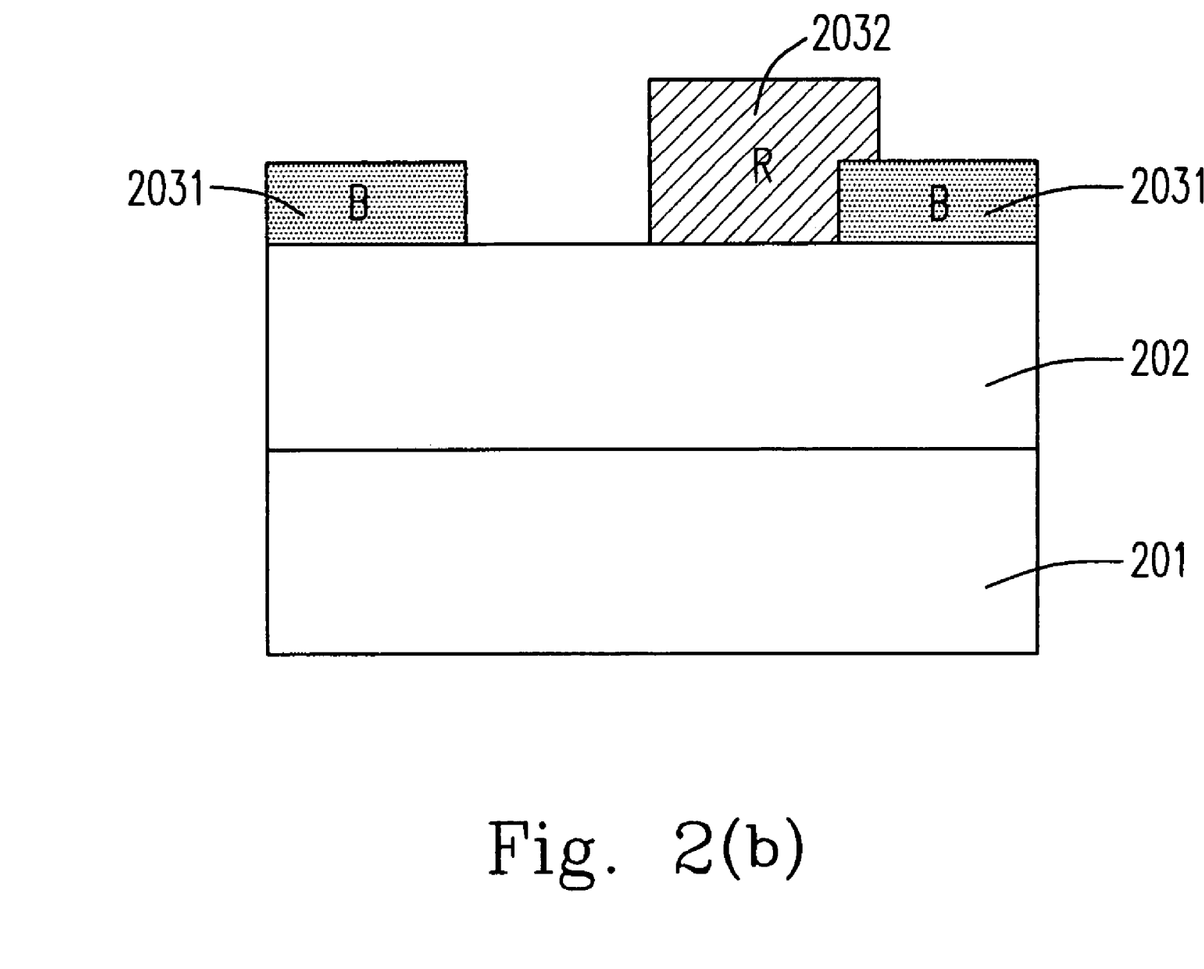
Figure 2C:
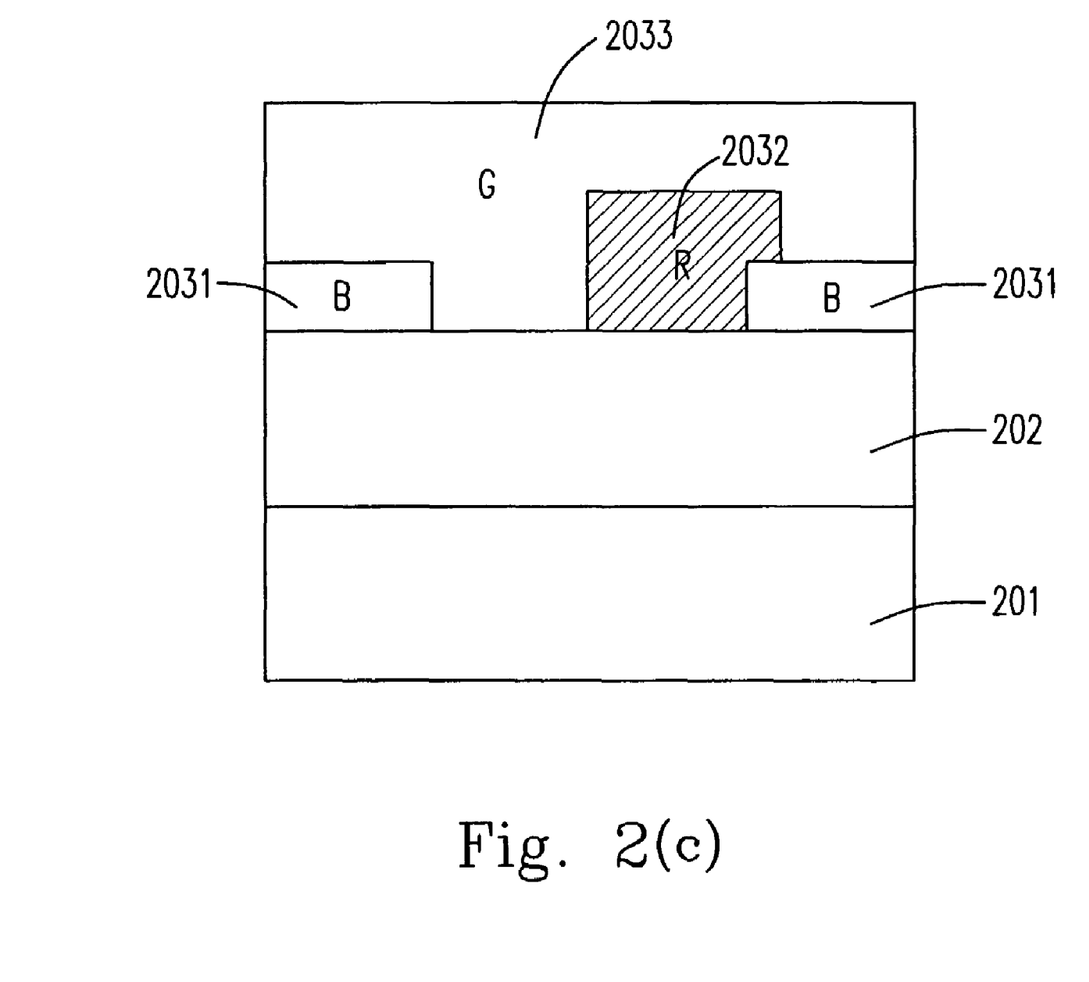
Figure 2D:
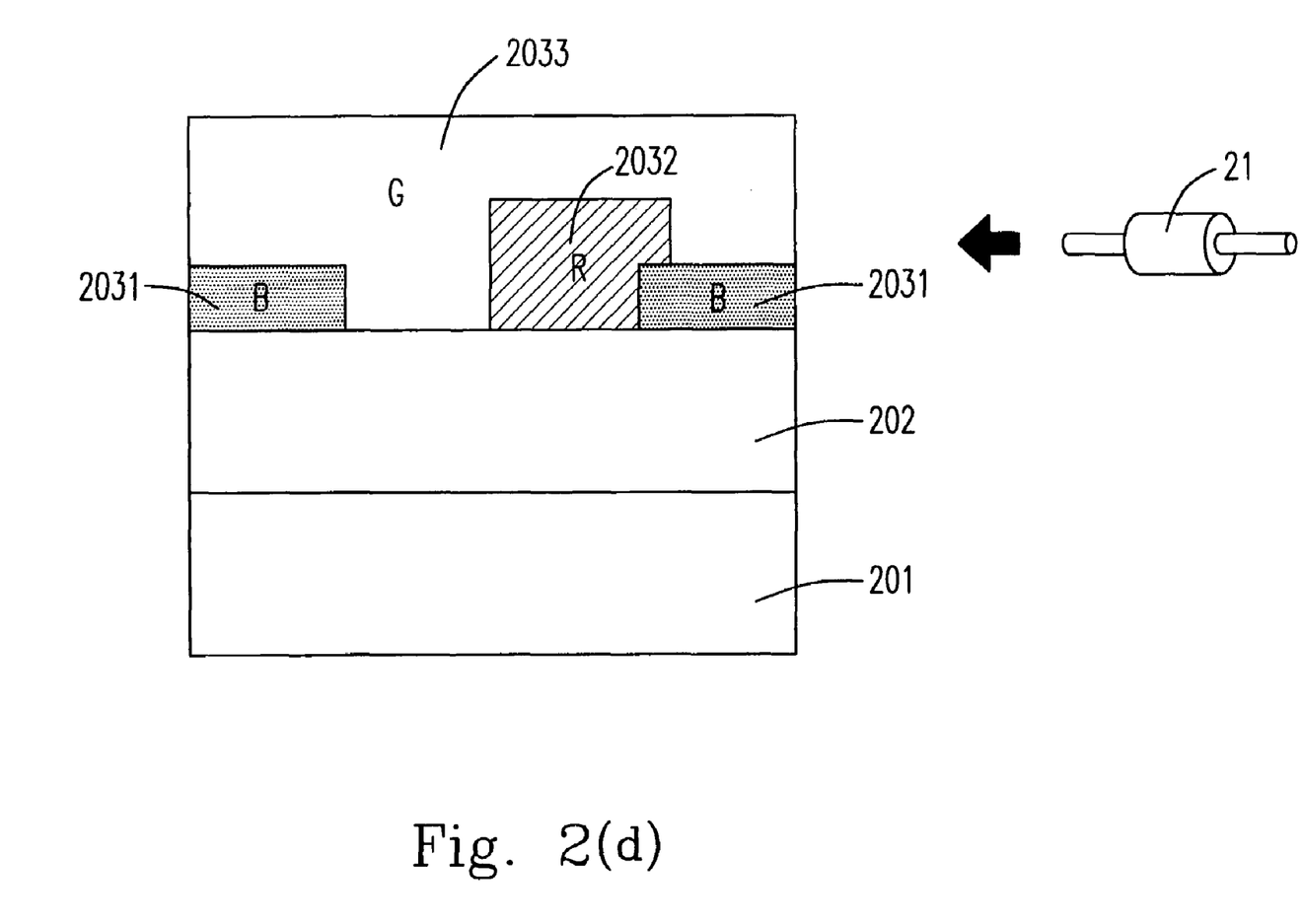
Figure 2E:
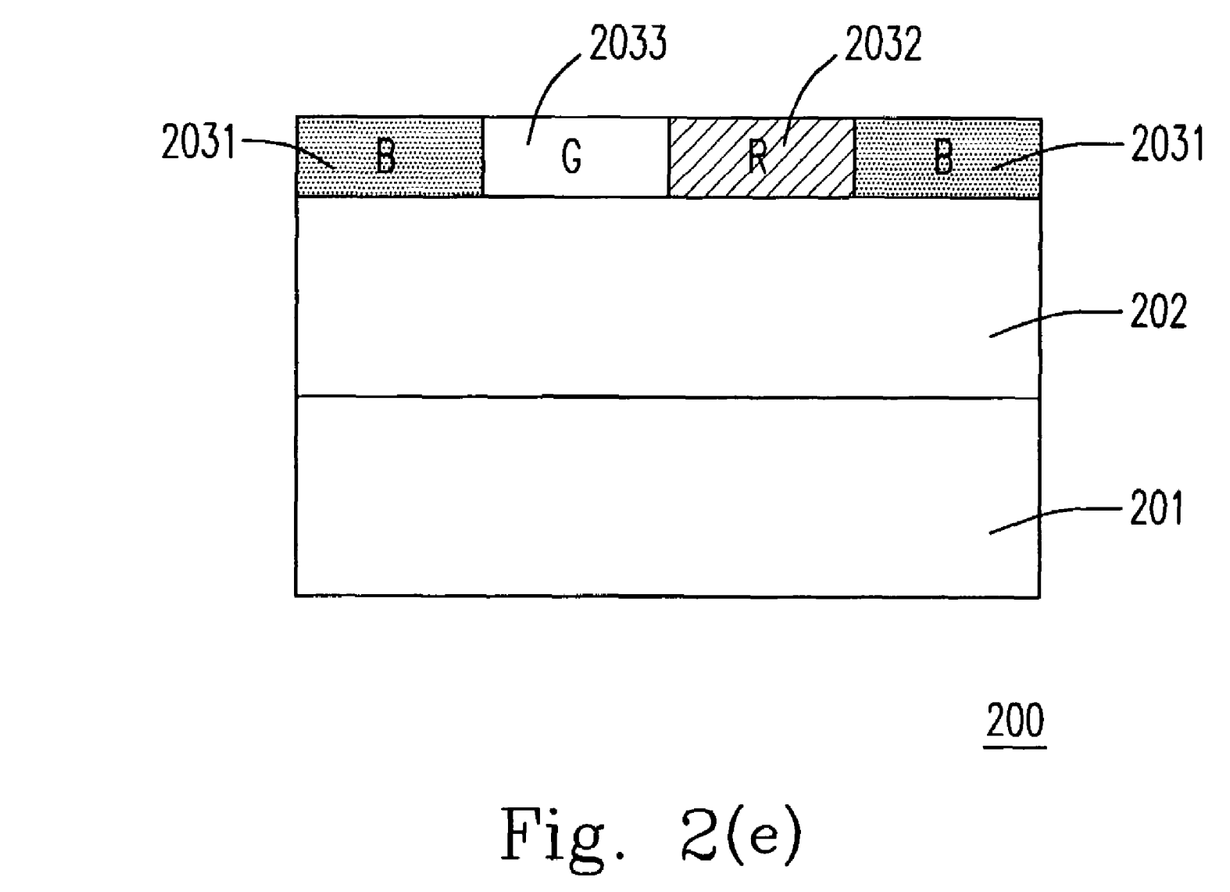
Figure 3A:
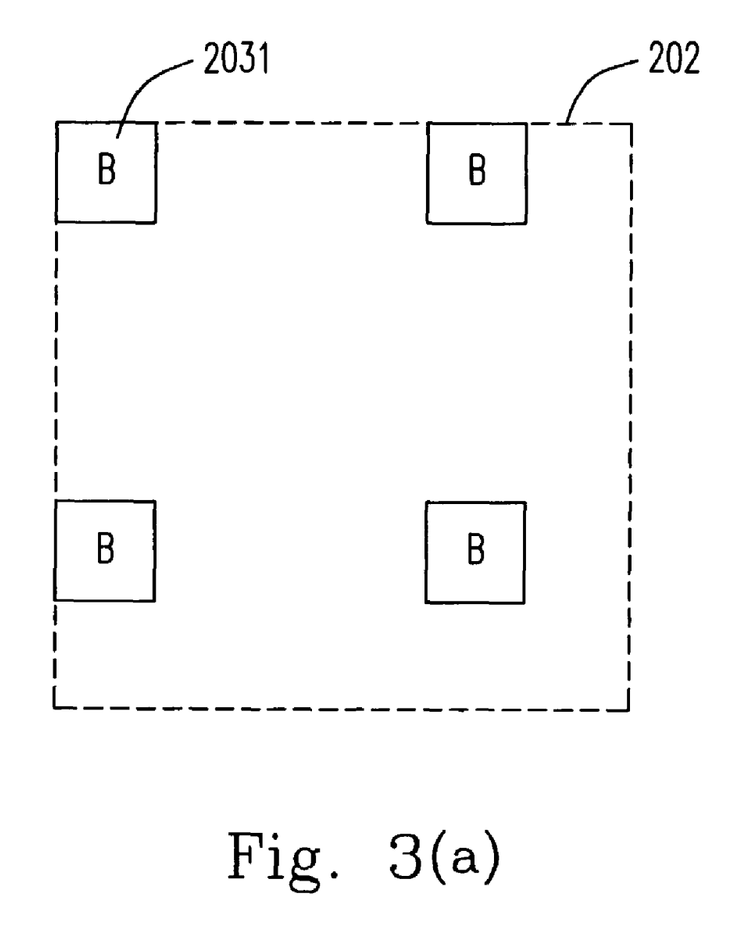

Please refer to FIG. 2 (a) to FIG. 2 (e), which show a method for fabricating a color filter according to the present invention. As shown in FIG. 2 (a), a transparent and polished dielectric layer 202 is formed on a substrate 201 of silicon oxide. Then a pixel, e.g. a blue pixel 2031, of a 25% pattern proportion is formed on the dielectric layer 202. The method for forming the blue pixel 2031 here is started by coating a blue photoresist, i.e. a negative photoresist made of a blue pigment, on the dielectric layer 202. Then a lithography process is provided such that the blue photoresist is solidified and several blue pixels 2031 are hence formed. A top view of the blue pixels is shown in FIG. 3 (a).

Figure 3B:
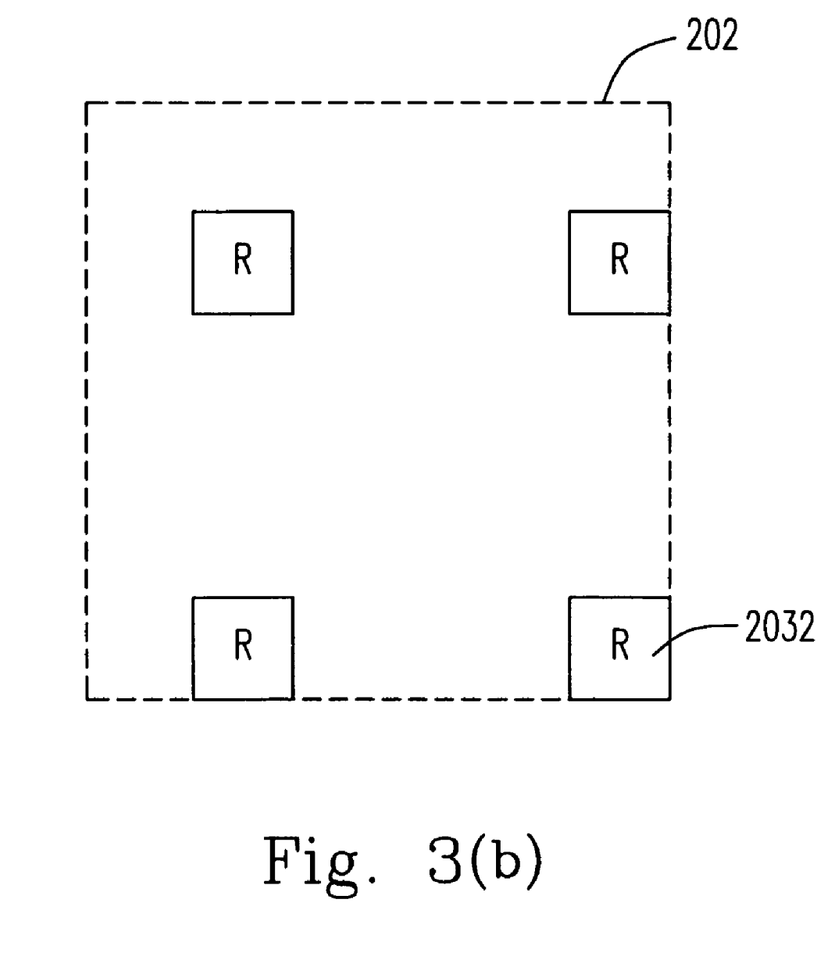

Next, a second kind of pixel, e.g. a red pixel 2032, of a 25% pattern proportion is formed on the dielectric layer 202, as shown in FIG. 2 (b). The method for forming the red pixel 2032 here is started by coating a red photoresist, i.e. a negative photoresist made of a red pigment, on the dielectric layer 202 and the blue pixels 2031. The thickness of the red photoresist is thicker than that of the blue photoresist. Then a lithography process is provided thereon such that the red photoresist is solidified and several red pixels 2032 are hence formed, which is shown in FIG. 3 (b). The red pixels 2032 next to the blue pixels 2031 are designed to be overlap to prevent the manufacturing process from the misalignment within an acceptable tolerance range. The phenomenon of the misalignment leads to a poor performance of colors.

In addition, the order of the pixel formation is able to be changed. That is to say, the formation of the red pixels 2032 is followed by the formation of the blue pixels 2031.

Figure 3C:
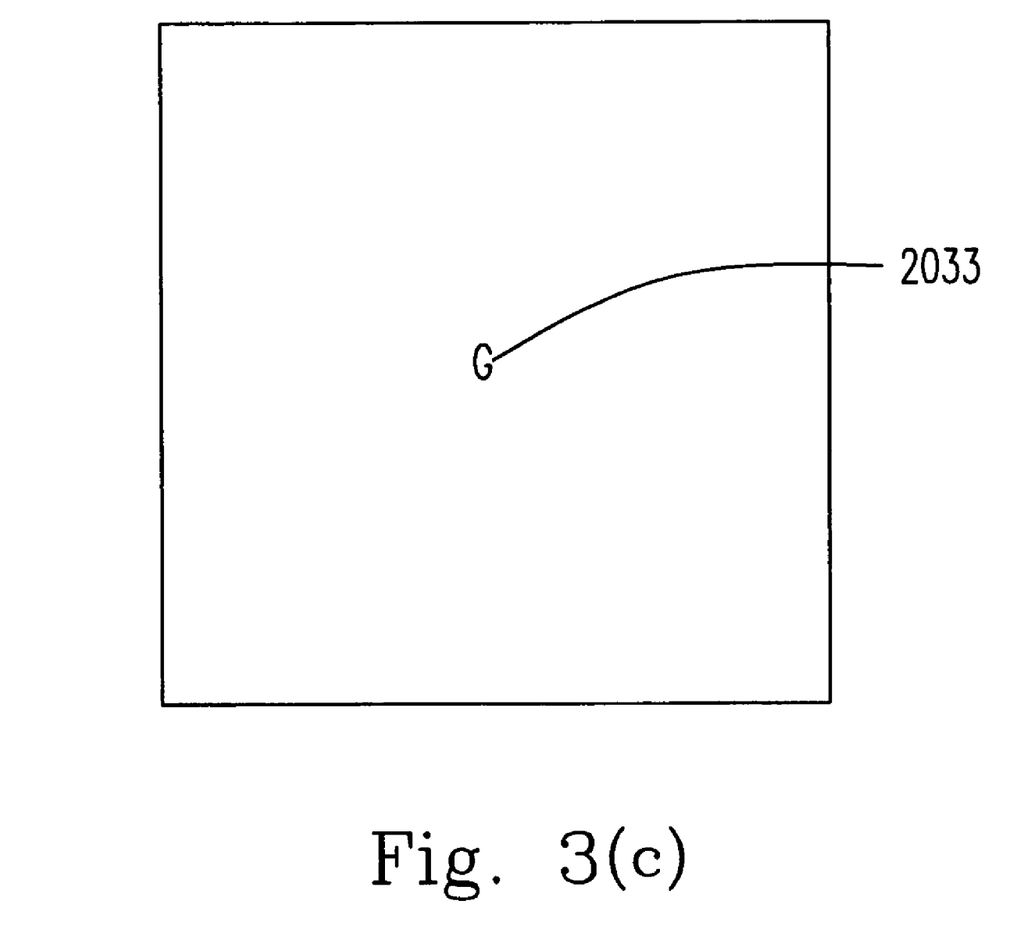

Next, a third kind of pixel, e.g. a green pixel 2033, of a 50% pattern proportion is formed on the dielectric layer 202, as shown in FIG. 2 (c). The method for forming the green pixel 2033 here is started by coating a green photoresist, i.e. a negative photoresist made of a green pigment, on the dielectric layer 202, the blue pixels 2031, and the red pixels 2032. The thickness of the green photoresist is thicker than that of the red photoresist. Then a lithography process is provided thereon such that the whole dielectric layer 202 is covered with the green photoresist, as shown in FIG. 3 (c).

Finally, a calendering process is performed. Please refer to FIG. 2 (d), a cylinder, e.g. a roller 21 or a rolling machine (not shown) is calendered on the blue pixels 2031, the red pixels 2032, and the green pixels 2033, so that the surfaces of the blue pixels 2031 and the red pixels 2032 are exposed. Then the blue pixels 2031, the red pixels 2032, and the green pixels 2033 are hence fabricated as shown in FIG. 2 (e), and no overlap or gap is formed thereamong. The blue pixels 2031, the red pixels 2032, and the green pixels 2033 have a flat surface in common because the speed and depth of the calendaring process can be controlled precisely. The fabricated blue pixels 2031, red pixels 2032, green pixels 2033, and the substrate 201 as well as the dielectric layer 202 compose a color filter 200, which has a flat surface and an identical thickness of each layers.

The method for fabricating a color filter according to this invention has the following advantages:

First, by precisely controlling the calendaring process, the three kinds of pixels are well polished so that the surface thereof is roughless.

Second, compared with the prior art, the method of this invention costs less because the etch-back process is needless therein.

Thirdly this invention provides a simplified fabricating process of an color filter because the green photoresist is formed just by one lithography process. That is to say, only one pattern-forming process is needed in the present invention.

The method for fabricating a color filter according to this invention is able to reduce the cost for manufacturing a color filter substantially and to make the performance of the color filter better.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for fabricating a color filter, comprising steps of:
    providing a substrate and forming a dielectric layer thereon;
    performing a first lithography process with a first photoresist on said dielectric layer to form a plurality of first pixels;
    performing a second lithography process with a second photoresist on said dielectric layer to form a plurality of second pixels, wherein said second pixels overlap said first pixels, which said second pixels are next to;
    performing a third lithography process with a third photoresist on said dielectric layer such that said dielectric layer is covered with said third photoresist; and
    calendering said third photoresist through a cylinder to form a plurality of third pixels and to form a flat surface by said first, said second and said third pixels.

2. The method according to claim 1, wherein said dielectric layer is made of silicon oxide.

3. The method according to claim 1, wherein said first photoresist is a blue photoresist, said first pixels are blue pixels, said second photoresist is a red photoresist, said second pixels are red pixels, said third photoresist is a green photoresist, and said third pixels are green pixels.

4. The method according to claim 3, wherein said blue, said red, and said green photoresists are negative photoresists.

5. The method according to claim 1, wherein said first photoresist is a red photoresist, said first pixels are red pixels, said second photoresist is a blue photoresist, said second pixels are blue pixels, said third photoresist is a green photoresist, and said third pixels are green pixels.

6. The method according to claim 5, wherein said blue, said red, and said green photoresists are negative photoresists.

7. The method according to claim 1, wherein said cylinder is a roller.

8. A method for fabricating a color filter, comprising steps of:
    providing a substrate and forming a dielectric layer thereon;

performing a first lithography process with a first photoresist on said dielectric layer to form a plurality of first pixels;

performing a second lithography process with a second photoresist on said dielectric layer to form a plurality of second pixels, wherein said second pixels overlap said first pixels, which said second pixels are next to;

performing a third lithography process with a third photoresist on said dielectric layer such that said dielectric layer is covered with said third photoresist; and calendering said third photoresist to form a plurality of third pixels and to form a flat surface by said first, said second and said third pixels.

9. The method according to claim 8, wherein said dielectric layer is made of silicon oxide.

10. The method according to claim 8, wherein said first photoresist is a blue photoresist, said first pixels are blue pixels, said second photoresist is a red photoresist, said second pixels are red pixels, said third photoresist is a green photoresist, and said third pixels are green pixels.

11. The method according to claim 10, wherein said blue, said red, and said green photoresists are negative photoresists.

12. The method according to claim 8, wherein said first photoresist is a red photoresist, said first pixels are red pixels, said second photoresist is a blue photoresist, said second pixels are blue pixels, said third photoresist is a green photoresist, and said third pixels are green pixels.

13. The method according to claim 12, wherein said blue, said red, and said green photoresists are negative photoresists.

14. The method according to claim 8 further comprises a step of: stretching said third photoresist by a rolling machine.

* * * * *